(12) United States Patent
Imada

(10) Patent No.: US 6,408,135 B1
(45) Date of Patent: *Jun. 18, 2002

(54) CONTROL DEVICE FOR IMAGE BLUR CORRECTION

(75) Inventor: Shinji Imada, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/499,680

(22) Filed: Feb. 8, 2000

(30) Foreign Application Priority Data

Feb. 16, 1999 (JP) .......................... 11-036760

(51) Int. Cl.7 ............................................. G03B 17/00
(52) U.S. Cl. ....................................... 396/55; 396/419
(58) Field of Search ................... 396/55, 419; 348/208; 359/554–557

(56) References Cited

U.S. PATENT DOCUMENTS

| 609,895 | A | * | 8/1898 | Furuyama .................... 396/55 |
| 5,615,397 | A | | 3/1997 | Shiomi ........................ 396/55 |
| 5,659,807 | A | * | 8/1997 | Nakamura et al. ............ 396/55 |
| 5,729,770 | A | * | 3/1998 | Kai et al. ................ 396/55 X |
| 5,771,403 | A | | 6/1998 | Imada .......................... 396/52 |
| 5,825,415 | A | * | 10/1998 | Kanada et al. .............. 348/208 |
| 5,881,324 | A | | 3/1999 | Imada .......................... 396/42 |
| 6,035,134 | A | | 3/2000 | Sato et al. .................... 396/55 |
| 6,091,448 | A | * | 7/2000 | Washisu et al. ............. 348/208 |

\* cited by examiner

*Primary Examiner*—W. B. Perkey
(74) *Attorney, Agent, or Firm*—Fitzpatrick, Cella, Harper & Scinto

(57) ABSTRACT

A control device for an image blur correction which is applied to an image blur correction device that conducts image blur correcting operation in response to a signal corresponding to an output of a vibration detection sensor, includes a support state judging device for judging whether the device is in a predetermined support state or not, in accordance with the signal corresponding to the output of the vibration detection sensor, an operation state control device for changing the operating state of the image blur correction device in response to the judgment result by the support state judging means so as to set the operating state to a first state in which the image blur correction device does not conduct the given image blur correcting operation when the support state judging device judges that the device is in the predetermined support state, and to set the operating state to a second state in which the image blur correction device conducts the given image blur correcting operation in response to a judgement by the support state judging device that the device is released from the predetermined support state and a regulating device for regulating the shift of the state from the first state to the second state, when the predetermined operation of the camera starts, in response to a judgement by the support state judging device, which is responsive to the judgement by the support state judging device that the device is released from the predetermined support state.

32 Claims, 10 Drawing Sheets

CONTROL DEVICE FOR IMAGE BLUR CORRECTION

BACKGROUND OF THE INVENTION

1. Field of the Invention

The present invention relates to a control device for image blur correction which is applied to an image blur correction device for correcting image blur occurring in an optical equipment, such as a camera.

2. Related Background Art

In existing cameras, because all important photographing operations, such as exposure or focusing operations, are automatically executed, the possibility that failure to perform a desired photographing operation will occur, even by a person not skilled in camera operation, is significantly reduced.

Also, in recent years, a system for preventing hand vibration which is applied to the camera has been studied, and factors that induce photographing error caused by the photographer now have almost been eliminated.

Now, an image blur correction device which prevents hand vibration will be described in brief.

Hand vibration of the camera at the time of photographing normally has a vibration frequency in the range of 1 to 12 Hz. A basic idea for taking a picture without image blur even if such hand vibration occurs at the time of a shutter release is that the vibration of the camera due to hand vibration is detected, and a correction lens is displaced in response to the detected value. Accordingly, in order that a photograph having no image blur can be taken even if the vibration of the camera occurs, it is necessary to first detect vibration of the camera with accuracy and then to correct for image displacement in an optically axial direction due to the hand vibration.

The detection of the vibration (camera vibration) can be theoretically performed by installing in the camera a vibration detection device comprised of a vibration sensor that detects an angular acceleration, an angular velocity, an angular displacement and the like, and a camera vibration detecting circuit that electrically or mechanically integrates the output signals of the vibration sensor so as to output a signal indicating the angular displacement. Then, image blur is corrected by driving a correction optical device that decanters the photographic optical axis on the basis of the above detection information.

Now, an outline of an image blur prevention system having a vibration sensor will be given with reference to FIG. 8. FIG. 8 is a schematic diagram showing an image blur correction device that suppresses image blur caused by a camera vertical vibration $81p$ and a camera horizontal vibration $81y$ in a direction indicated by an arrow $81$, in the case where the image blur correction device is mounted on an interchangeable lens of a single-lens reflex camera.

In FIG. 8, reference numeral $82$ denotes a lens barrel, and $83p$ and $83y$ are vibration detection devices which detect the camera vertical vibration and the camera horizontal vibration, respectively, where the respective vibration detection directions are indicated by reference symbols $84p$ and $84y$. Reference numeral $85$ denotes a correction optical device (reference symbols $86p$ and $86y$ denote coils which give thrust in two directions to the correction optical system $85$ in the two directions, respectively, and $87p$ and $87y$ are position detecting elements that detect the position of the correction optical device $85$ in the two directions, respectively), and the correction optical device $85$ is formed with a position control loop and driven with outputs from the vibration detection devices $83p$ and $83y$ as desired values so as to ensure stability at an image surface $88$.

FIG. 9 is an exploded perspective view showing an example of the structure of the above-described correction optical device $85$, which will be described below.

A back surface projected ear $71a$ of a base plate $71$ is inserted into a lens barrel (not shown), and a known lens barrel roller or the like is screwed into a hole $71b$ so as to be fixed to the lens barrel. A second yoke $72$ made of magnetic substance is screwed into a hole $71c$ of the base plate $71$ by a screw that threads through the hole $72a$ of the second yoke $72$, and permanent magnets (shift magnets) $73$ such as neodymium magnets are magnetically adsorbed to the second yoke $72$. Coils $76p$ and $76y$ (shift coils) are inserted into a support frame $75$ to which a correction lens $74$ is fitted by a C-ring or the like. A first yoke $712$ is inserted into positioning holes $712a$ by respective pins of the base plate $71$, and the first yoke $712$ is magnetically coupled at its backing surface to the base plate $71$ by a magnetic force of the permanent magnets $73$.

One end of an L-shaped shaft $711$ is inserted into a bearing portion $75d$ of the support frame $75$, and the other end of the L-shaped shaft $711$ is inserted into a bearing portion $71d$ formed in the base plate $71$. Also, the shaft $711$ is slidably supported only in directions indicated by arrows $713p$ and $713y$ with respect to the base plate $71$, to thereby regulate the relative rotation (rolling) about the optical axis with respect to the base plate $71$ of the support frame $75$.

The coils $76p$ and $76y$ are located within respective closed magnetic circuits formed of the permanent magnets $73$, the first yoke $712$ and the second yoke $72$. In this arrangement, when a current is permitted to flow in the coil $76p$, the support frame $75$ is driven in the direction indicated by the arrow $713p$, whereas when a current is permitted to flow in the coil $76y$, the support frame $75$ is driven in the direction indicated by the arrow $713y$.

When the support frame $75$ moves on a plane perpendicular to the optical axis, an incident position of a light emitted from light projecting elements $77p$ and $77y$ and passing through slits $75ap$ and $75ay$ is changed on the position detecting elements $78p$ and $78y$. In general, when the outputs of the position detecting element $78p$ and $78y$ are amplified by ICs $731p$ and $731y$ and the coils $76p$ and $76y$ are driven by the amplified outputs, the support frame $75$ is driven so that the outputs of the position detecting elements $78p$ and $78y$ are changed. In this example, the drive directions (polarities) of the coils $76p$ and $76y$ are set so that the outputs of the position detecting elements $78p$ and $78y$ become small (negative feedback), the support frame $75$ is stabilized by the drive forces of the coils $76p$ and $76y$ at a position where the outputs of the position detecting elements $78p$ and $78y$ become substantially zero.

The above-mentioned method of driving the support frame $75$ by negatively feeding back the position detection output is called "position control manner", and for example, when a desired value (for example, a hand vibration angle signal) is mixed with the ICs $731p$ and $731y$ from an external source, the support frame $75$ is extremely faithfully driven in accordance with the desired value.

Actually, the outputs of differential amplifiers $731cp$ and $731cy$ are supplied to a main substrate (not shown) through a flexible substrate $716$, subjected to A/D conversion and then taken in a microcomputer (not shown).

The A/D converted outputs are appropriately compared with the desired value (hand vibration angle signal) and amplified within the microcomputer, and then subjected to leading phase compensation (for more stabilizing position control) through a known digital filter manner. Thereafter, the signals subjected to the leading phase compensation again pass through the flexible substrate 716, and are then input to an IC 732 (for driving the coils 76p and 76y). The IC 732 conducts known PWM (pulse width modulation) drive on the coils 76p and 76y on the basis of the input signals to drive the support frame 75.

Also, when the correction optical device is not operated, it is necessary to lock the support frame 75. Three projections (not shown) are disposed on a back surface of the support frame 75. The leading edges of those projections are inserted into the inner peripheral surface of a lock ring 719 so that the support frame 75 is fixed. Specifically, when electricity is supplied to a coil 720 through a magnetic circuit consisting of the coil 720 and a lock magnet 718, the lock ring 719 rotates against a lock spring 728, an armature 724 is abutted against an adsorption yoke 729 and electricity is supplied to an adsorption coil 730, as a result of which the armature 724 is adsorbed by the adsorption yoke 729. In this situation, when the supply of electricity to the coil 720 stops, the lock ring 719 is going to return to an original position due to the force of the lock spring 728. However, because the armature 724 is adsorbed by the adsorption coil 729, rotation is regulated, thereby leading to a lock release state. In the case of returning to a lock state, the supply of electricity to the adsorption coil 730 stops so that the lock ring 719 rotates due to the force of the lock spring 728, and the projections of the support frame 75 are inserted into the inner peripheral surface of the lock ring 719, to thereby come to the lock state.

FIG. 10 is a block diagram showing the electric schematic structure of the image blur correction device.

The output of an image blur detection device 2 is processed by a signal processing circuit 3 that executes amplification, high-pass filtering, low-pass filtering and so on, converted into a digital signal by an A/D conversion portion 4 within a microcomputer 1, and then subjected to data processing such as offset removal, high-pass filtering and integration by a data processing portion 5. Also, the output of a position detection device 6 that conducts the position detection of the correction lens is processed by a signal processing circuit 7 that conducts low-pass filtering and so on, converted into a digital signal by an A/D conversion portion 8 within the microcomputer 1 and then subjected to data processing such as amplification by a data processing portion 9. Then, those two signals are calculated by a feedback calculation portion 10 and subjected to amplification and known leading phase compensation by a leading phase compensation portion 11. Then, a drive signal of the correction lens is output to a port of the microcomputer 1, and the correction lens is driven by a correction lens driving device 12 to perform image blur correction.

Also, when image blur correction is not conducted, the correction lens is brought into the lock (engagement) state, whereas when image blur correction is conducted, it is brought into the unlock state. A lock/unlock driving device 13 is designed so as to drive the correction lens.

Then, image blur correction has an optimum characteristic which is adapted to various circumstances such as a case in which a user performs photography while holding a camera by hand or a case in which the user performs photography while the camera is held by a tripod. For example, in the case of a single-lens reflex camera, when the user performs photography while holding the camera by hand, a characteristic of the image blur correction may be set so as to correct even vibration of a low frequency produced by hand vibration. On the other hand, when the user performs photography while the camera is held by a tripod, since no vibration of a low frequency occurs, a characteristic of the image blur correction may be set so as to correct only vibration of a high frequency produced by a quick return mirror and a shutter of the camera. This is because the photographing result is deteriorated by the drifting of a vibration sensor if low frequency correction is effected. In view of this fact, it has been proposed that the support state of the camera be detected, and the image blur correction characteristic be set in accordance with the detected support state.

As one method of detecting the support state of the camera, there is a method of conducting the detection in accordance with a signal level of the vibration sensor. This method is designed so that if the signal level of the vibration sensor within a given period of time is smaller than a predetermined value, the camera holding state is judged as a tripod support state. In this situation, a timing at which the tripod detection starts may be set to the half-depression operation of a release button so as to be synchronized with the photographing intention of the user.

In this example, if the user completely depresses the release button of the camera from a half-depression state to shift the operation to release operation, the mirror and the shutter are driven. However, if such operation is conducted in the tripod support state, the level of the vibration sensor signal is caused to exceed the tripod detection level due to the impact of the mirror and shutter drive, as a result of which there is the possibility that it is detected that the camera is supported by hand, although the camera is in fact supported by a tripod.

Also, in a camera system of the interchangeable lens type, since photographing is enabled without driving a mirror or shutter, depending on the sort of a camera attached to the interchangeable lens having an image blur correction function, it is necessary that the control of tripod detection during photographing is most preferably changed in accordance with the attached camera.

SUMMARY OF THE INVENTION

The present invention has been made to solve the above problems associated with the prior art, and therefore has as an object thereof to provide a control device for image blur correction which prevents the operating state of an image blur correction device from being unintentionally changed over due to an influence of a predetermined operation of a camera.

In order to achieve the above object, according to one aspect of the present invention, there is provided a control device for image blur correction which is applied to an image blur correction device that conducts an image blur correcting operation in response to a signal corresponding to an output of a vibration detection sensor, where the control device comprises:

support state judging means which judges whether the device is in a given support state or not, in accordance with the signal corresponding to the output of the vibration detection sensor;

operation state control means which changes the operating state of the image blur correction device in response to the judgement result by the support state judging means so as to set the operating state to a first state, in which the image blur correction device does not conduct the given image blur correcting operation when the support state judging means judges that the device is in the given support state, and to shift the operating state to a second state, in which the image blur correction device conducts the given image blur correcting operation in response to a judgement by the support state judging means that the device is released from the given support state; and regulating means which regulates the shift of the state from the first state to the second state, when the predetermined operation of the camera starts, in response to a judgement by the support state judging means, which is responsive to the judgement by the support state judging means that the device is released from the given support state.

DETAILED DESCRIPTION OF THE PREFERRED EMBODIMENTS

Now, a description will be given in more detail of preferred embodiments of the present invention with reference to the accompanying drawings.
(First Embodiment)

Figure 1:
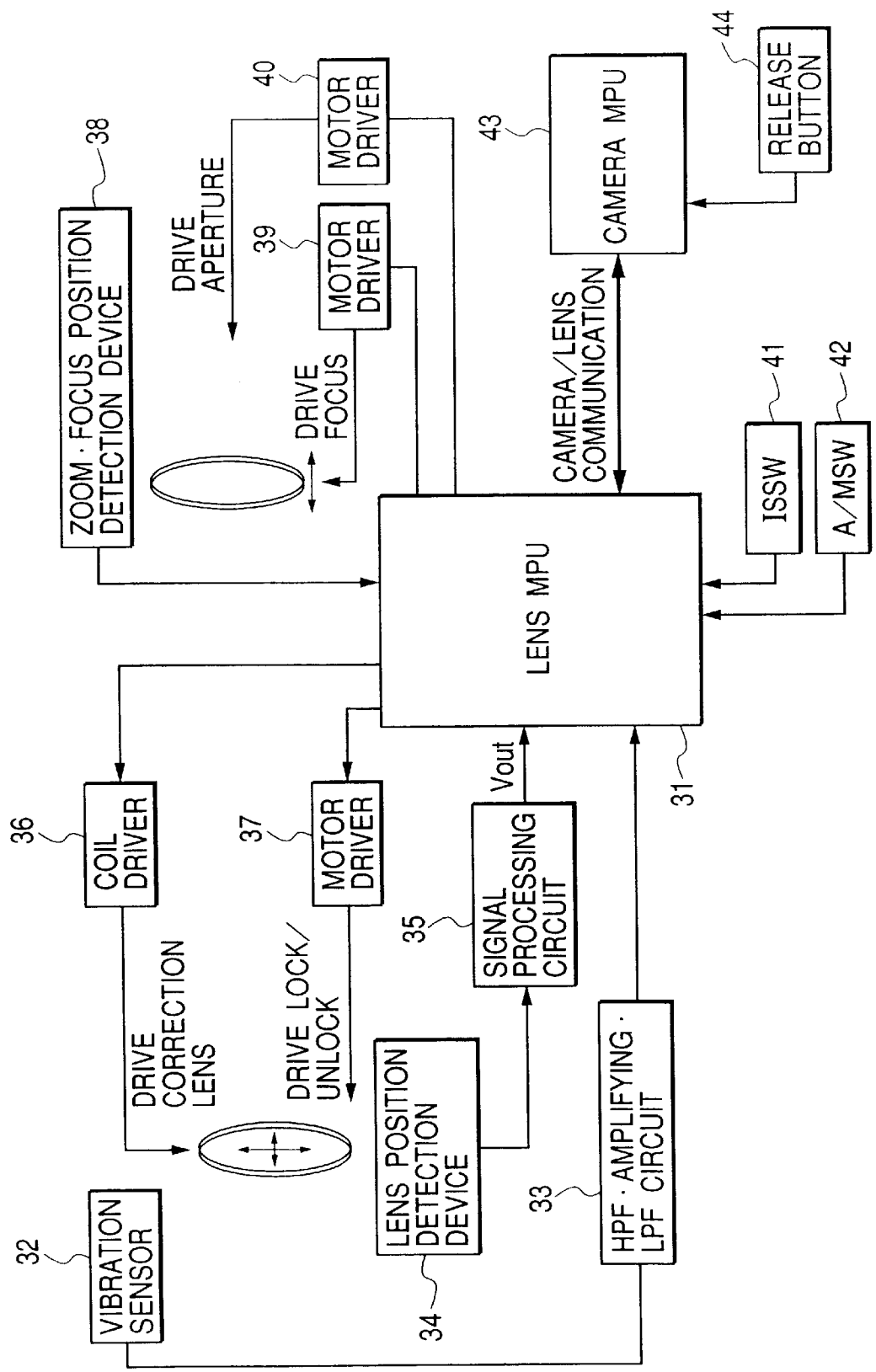
FIG. 1 is a block diagram showing the structure of an interchangeable lens for a single-lens reflex camera in accordance with a first embodiment of the present invention.

FIG. 1 is a block diagram showing the schematic structure of an optical equipment in accordance with a first embodiment of the present invention. In this embodiment, a case is assumed in which the interchangeable lens for a single-lens reflex camera is applied as an example of the optical equipment.

Referring to FIG. 1, reference numeral 31 denotes a lens MPU which controls lens side operation through communication with a camera. Reference numeral 32 denotes a vibration sensor that detects vibration (showing an example using an angular velocity sensor in the following embodiment). An output signal from the vibration sensor 32 has a d.c. component cut off through a high-pass filter and is subjected to amplification and low-pass filtering for noise removal through an HPF, amplifying and LPF circuit 33, and is thereafter input to an A/D conversion terminal of the MPU 31. Also, an output of a lens position detection device 34 that conducts the position detection of the correction lens is subjected to processing such as filtering through a signal processing circuit 35 and then input to an A/D conversion input terminal of the MPU 31. Those two vibration signal and position detection signal are subjected to feedback calculation through the MPU 31 and drive the correction lens through a coil driver 36, to thereby correct image blur.

Also, when image blur correction is not conducted, the correction lens is locked, but when image blur correction is conducted, the correction lens is unlocked (released from locking). The structure for achieving this operation is the same as that shown in the conventional example and the lock/unlock operation is conducted through a motor driver 37.

Also, in addition to the above-described image blur correction control the MPU 31 drives a focus lens and an aperture through a zoom focus position detection device 38 and motor drivers 39 and 40.

Reference numeral 41 denotes an operation select switch (ISSW) that selects whether image blur correction (image stabilization) is conducted or not, and numeral 42 denotes a switch (A/MSW) that selects whether automatic focusing or manual focusing is conducted.

The above-described lens MPU 31 conducts camera/lens communication with a camera MPU 43 to confirm the respective statuses of the camera and the lens (a focal distance, the switch state and so on) and transmits a drive command for the focusing, aperture and so on.

Reference numeral 44 denotes a release button which is generally formed of a two-stroke switch such that a switch SW1 turns on by a first stroke (half depression) of the release button 44, and a release switch SW2 turns on by a second stroke (complete depression).

Figure 2:
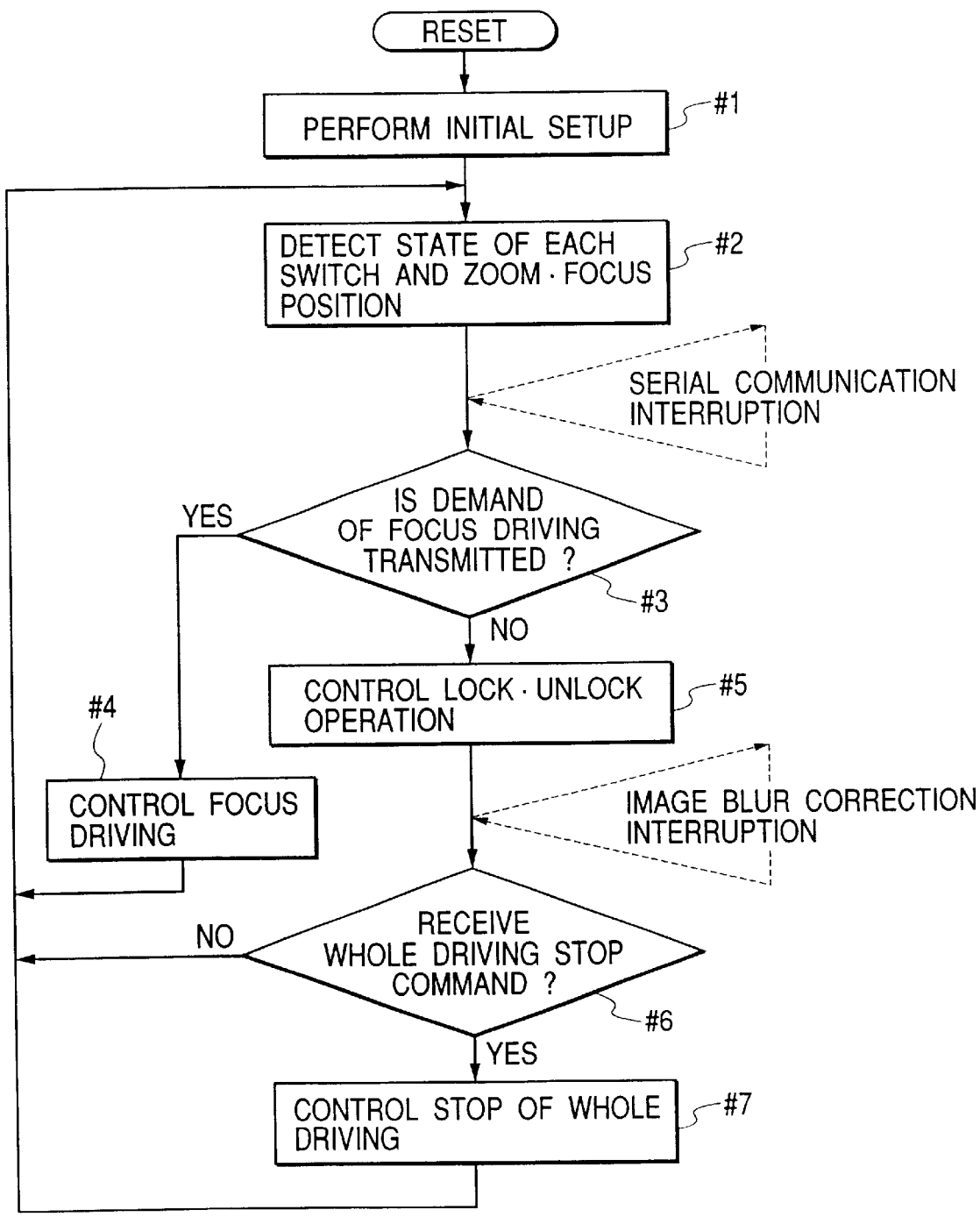
FIG. 2 is a flowchart showing the main operation of a lens MPU shown in FIG. 1.

Subsequently, the specific operation of the above-described lens MPU 31 will be described with reference to a flowchart shown in FIG. 2. In this first embodiment, it is assumed that the detection of a tripod starts when the above switch SW1 turns on.

When a lens is attached to the camera, a serial communication from the camera MPU 43 to the lens MPU 31 is conducted, and the lens MPU 31 starts to operate from step #1.

First, instep #1, initial setup for lens control and image blur correction control is conducted, and in succeeding step #2, the states of the ISSW 41 and the A/MSW 42 are detected, and the zoom or focus state of the lens is detected by the zoom/focus position detection device 38. Then, in succeeding step #3, it is judged whether a demand for focus driving has been transmitted from the camera MPU 43 or not. If a demand for the focus driving has been received, processing is advanced to step #4, and since the drive amount of the focus lens is instructed from the camera MPU 43, the motor driver 39 is driven in response to the instructed drive amount to conduct the focus driving control.

Also, if a demand for focus driving has not been received in the above step #3, processing is advanced to step #5, in which the motor driver 37 is driven in response to the communication from the camera MPU 43 and the state of the ISSW 41 to control lock and unlock operation and to set an image blur correction start flag IS_START. Then, in succeeding step #6, it is judged whether a whole driving stop (the whole drive of the actuators within the lens stops) command has been received from the camera MPU 43 or not. If nothing is operated at the camera side, the whole driving stop command is transmitted from the camera MPU 43 after a short time. Then, processing is advanced step #7 to conduct whole driving stop control. In this step, whole actuator driving is stopped, and the lens MPU 31 is brought into a sleep (stop) state. Also, the supply of electricity to the image blur correction device is stopped. Thereafter, when something is operated at the camera side, the camera MPU 43 transmits a communication to the lens MPU 31 to release the sleep state.

If a demand for serial communication interruption or image blur correction interruption is received through a communication from the camera during the above operation, those interruption processings are executed.

The serial communication interruption processing decodes communication data and conducts lens processing such as aperture driving in accordance with the decoded result. Then, the turn-on of the switch SW1, the turn-on of the release switch SW2, a shutter time, the type of the camera and so on can be discriminated in accordance with the decoded communication data. As a result, detection of a tripod can start upon turning on the switch SW1 of the camera, and detection of a tripod can be interrupted upon turning on the release switch SW2. The detailed operation will be described later.

Also, image blur correction interruption is timer interruption occurring every given period (for example, 500 $\mu$sec). Then, since a pitch direction (longitudinal direction) control and a yaw direction (lateral direction) control are alternately conducted, a sampling period in one direction in this case becomes 1 msec. Also, since there are many identical portions in the control method with respect to each of these directions, only one system of program is prepared. Since the calculated result has different data between the pitch direction and the yaw direction, although the control method (calculation coefficient or the like) is identical therebetween, the respective reference addresses are set in the pitch direction and the yaw direction, data such as calculated result is designated by an indirect address of a RAM, and the reference address is switched over between the pitch control time and the yaw control time to thus conduct calculation.

Figure 3:
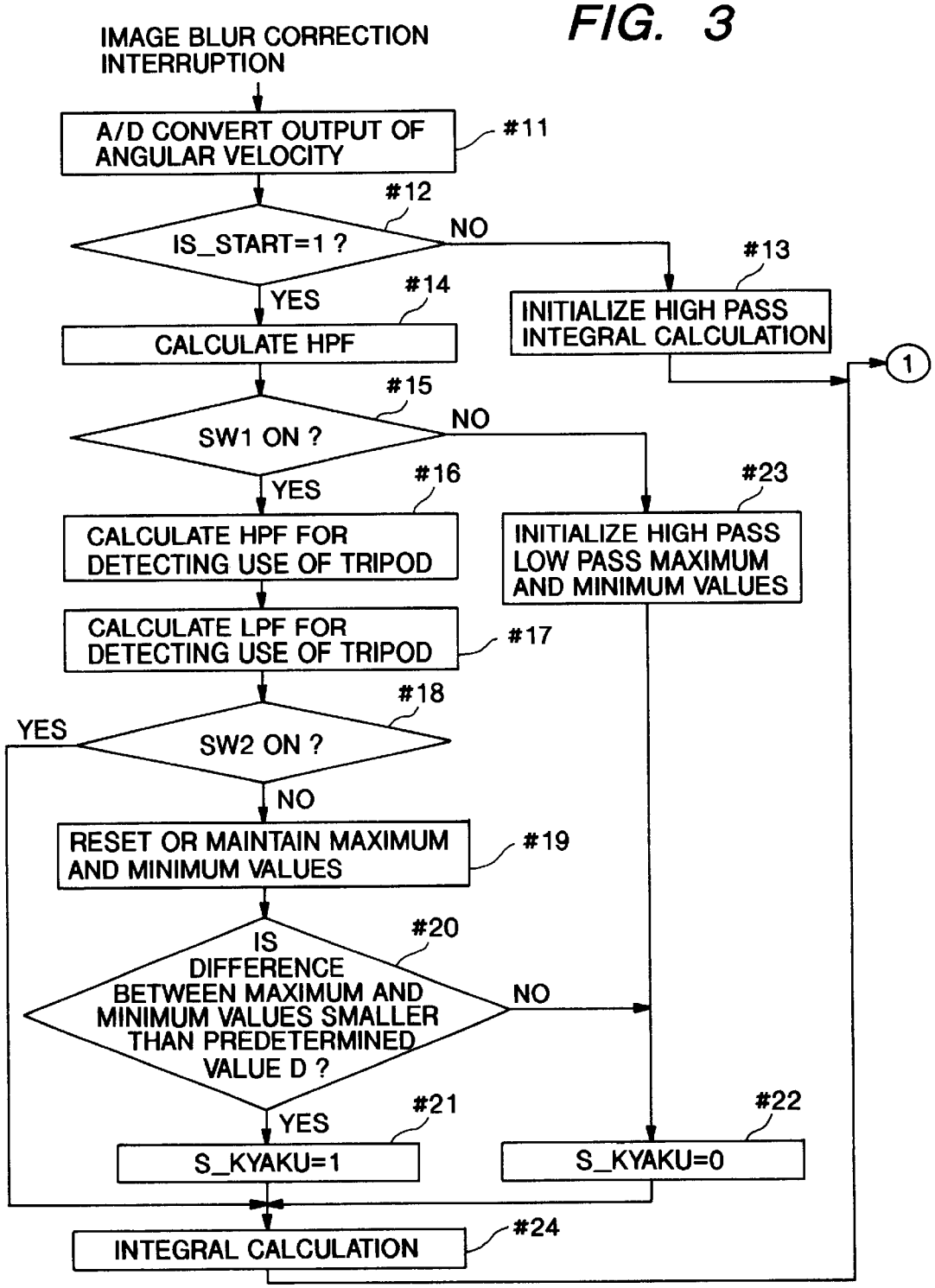
FIG. 3 is a flowchart showing a part of an image blur correction control operation in accordance with the first embodiment of the present invention.

If image blur correction interruption occurs during the main operation of the camera, the lens MPU 31 starts image blur correction control in step #11 of a flowchart shown in FIG. 3. The operation of detecting a tripod is also conducted in this image blur correction interruption.

First, in step #11, the output of an angular velocity sensor, which is vibration sensor 32 in the present application, is subjected to A/D conversion. In succeeding step #12, the judgement of the image blur correction start flag IS_START is made, and if the image blur correction start flag has been cleared, processing is advanced to step #13. Since image blur correction is not conducted, high-pass filtering and integral calculation are initialized, and processing is advanced to step #25, shown in FIG. 4.

On the other hand, if the image blur correction start flag is set, processing is advanced to step #14, and a high-pass filter calculation is conducted in order to carry out image blur correction. Also, a time constant is switched over for 2 to 3 seconds after the start of image blur correction, and image blur at rising time is relaxed. Also, the time constant is changed in accordance with the condition in which the camera is supported, by tripod or hand.

In succeeding step #15, it is judged whether the switch SW1 has been turned on or not. If the switch SW1 is on, processing is advanced to step #16 in order to start tripod detection to conduct high-pass filter calculation. In this example, high-pass filter calculation higher in cut-off frequency than the high pass filter calculation in the above step #14 is conducted. This is to remove drifting of the vibration sensor 32 as much as possible. Then, in succeeding step #17, low-pass filter calculation is conducted. This is to remove the noise component.

In succeeding step #18, it is judged whether the release switch SW2 has been turned on or not, and if the release switch SW2 is not on, processing is advanced to step #19 and subsequent steps to start a tripod detection operation. On the other hand, if the release switch SW2 is on, processing is advanced to a step #24 to interrupt the tripod detection operation.

In step #19, comparison is made whether the calculated result in the above step #17 exceeds the maximum value or the minimum value of the previous sampling or not, and if it exceeds either value, the maximum value or the minimum value is updated. Then, in succeeding step #20, it is judged whether a difference between the maximum value and the minimum value is smaller than a predetermined value D or not, and if the former is smaller than the latter value, processing is advanced to step #21, in which since the difference between the maximum value and the minimum value is smaller than the predetermined value D, judgement is made that the camera is supported by a tripod (S_KYAKU flag=1). Also, if the difference between the maximum value and the minimum value is larger than the predetermined value D, processing is advanced from step #20 to step #22, in which since the difference between the maximum value and the minimum value is larger than the predetermined value D, judgement is made that the camera is supported by hand (S_KYAKU flag=0).

Also, if the switch SW1 is not on in the above step #15, processing is advanced to step #23, in which the high-pass filtering, the low-pass filtering, the maximum and the minimum values for detection of the use of a tripod are initialized, and processing is advanced to the above-described step #22.

In step #24, the set characteristics (also including a case in which the image blur correction characteristic is changed depending on the fact that the camera is supported by tripod or hand) are subjected to integral calculation. As the integral characteristics, in case of holding the camera by hand, in order to correct vibration of a low frequency caused by hand vibration, the characteristic is set to an integral characteristic for integrating even: the low frequency component. In case of holding the camera by tripod, in order to correct only vibration of a high frequency caused by the quick return mirror and the shutter of the camera without correcting vibration of a low frequency component caused by hand vibration, the characteristic is set to an integral characteristic for integrating only the high frequency component.

As a result, the characteristics become angular displacement data $\theta$. In the case where panning is made, the cut-off frequency of integration is switched over in accordance with the vibration angle displacement. In succeeding step #25 of FIG. 4, since the eccentricity (sensitivity) of the correction lens to the vibration angle displacement is changed depending on the position of zoom/focus, adjustment is made. Specifically, the positions of zoom and focus are divided into several zones, respectively, and an average vibration isolation sensitivity (deg/mm) in each zone is read from table data and converted into correction lens driving data. The calculated result is stored in a RAM region set in SFTDRV within the lens MPU 31.

In succeeding step #26, the output of the lens position detection device 34 that conducts the position detection of the correction lens is subjected to A/D conversion, and the A/D converted result is stored in the RAM region set in SFTPST within the lens MPU 31. Then, in step #27, feedback calculation (SFTDRV-SFTPST) is conducted, and in succeeding step #28, a loop gain is multiplied by the calculated result in the above step #26, and in succeeding step #29, phase compensation calculation is conducted in order to provide a stable control system. Finally, in step #30, the result in the above step #29 is output to a port of the lens MPU 31 as PWM to complete interruption.

The output from the port of the above lens MPU 31 is input to the coil driver 36, and the correction lens is driven by a moving magnet to correct image blur.

As described above, the operation of detecting the use of a tripod starts in response to turning-on of the switch SW1 of the camera in step #15, and the operation of detecting the use of a tripod is interrupted by a judged result that the release switch SW2 is on in step #18. Therefore, misdetection that the camera supported by a tripod is in the hand support state, which is caused by the fact that the mirror driving impact and the shutter driving impact during photographing adversely affect the angular velocity sensor signal, can be reliably prevented without provision of any special means.

Also, in the above first embodiment, an example in which the detection of the use of a tripod is interrupted by turning on the release switch SW2 is described. Alternatively, if the judgement that the release switch SW2 is on in step #18 is changed to the judgement of whether a film is being fed or not, such mis-detection that the camera supported by a tripod is in a hand support state, which is caused by the fact that vibration caused by film feeding adversely affects the angular velocity sensor signal, can be reliably prevented.

Also, even judgement by the pop-up operation of a strobe built into the camera can obtain the same effect.

(Second Embodiment)

A second embodiment of the present invention is also applied to an interchangeable lens for a single lens reflex camera as in the above-described first embodiment, in which the operation of detecting the use of a tripod starts upon turning on the switch SW1 of the camera, and the judgement level of detecting the use of a tripod is changed upon turning on the release switch SW2. Also, a method of detecting the use of a tripod is that judgement is made that the camera is supported by a tripod if the maximum value of an angular velocity sensor is smaller than a predetermined value D1 or D2.

Figure 4:
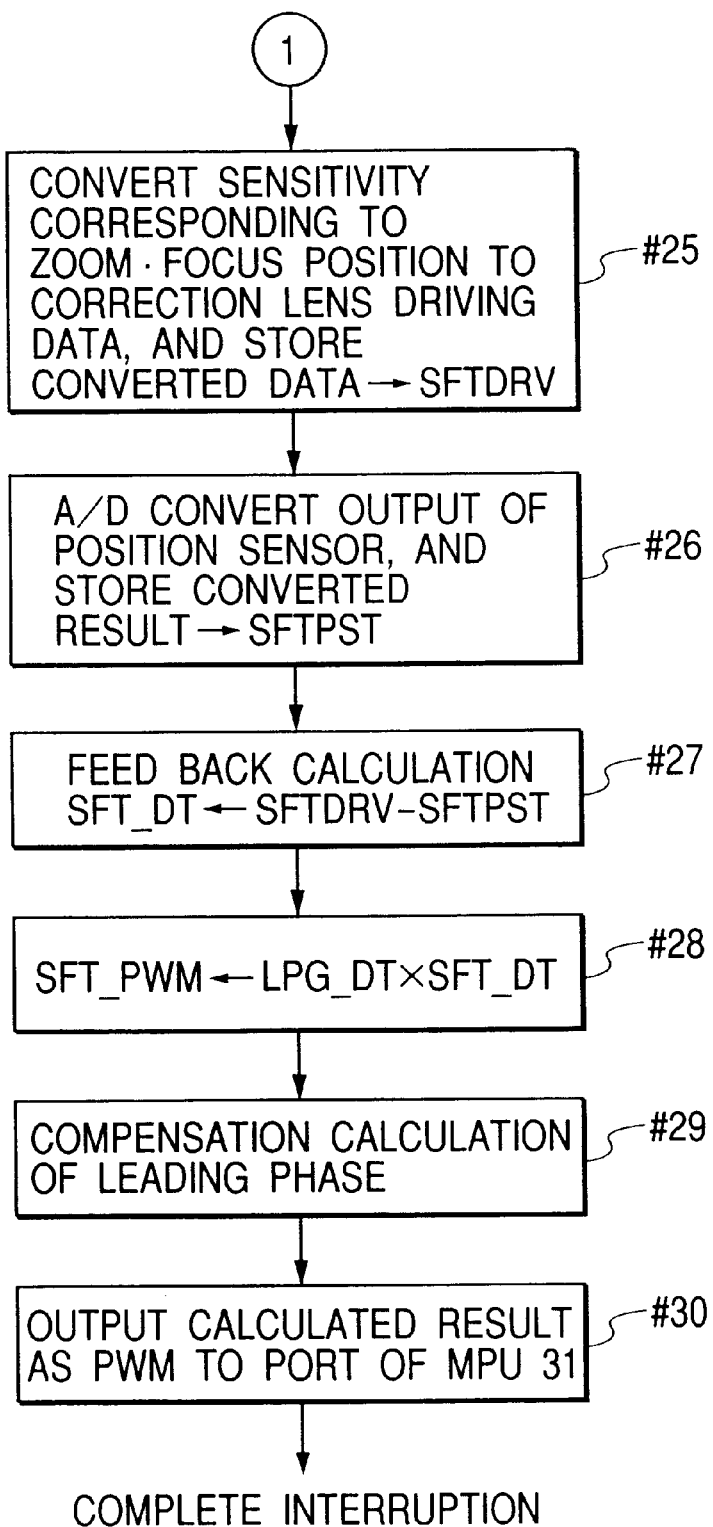
FIG. 4 is a flowchart showing the subsequent operation of FIG. 3.
Figure 5:
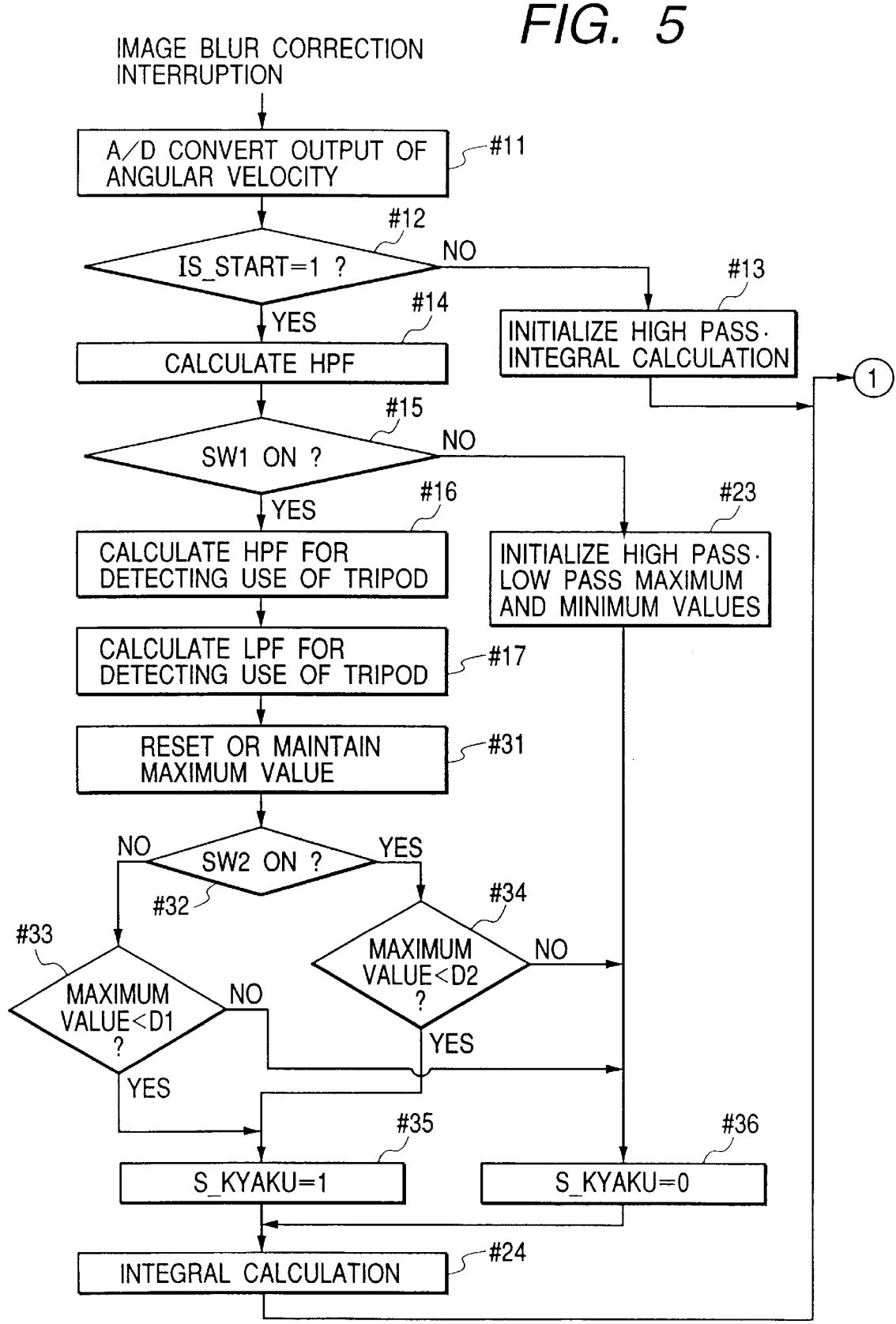
FIG. 5 is a flowchart showing a part of an image blur correction control operation in accordance with a second embodiment of the present invention.

FIG. 5 is a flowchart showing the operation of a main portion of the interchangeable lens side of the single-lens reflex camera in the second embodiment of the present invention, in which the same parts as those of the above first embodiment in FIG. 3 are designated by identical step numbers, and their description will be omitted. Also, since the operation shown in FIG. 5 and other figures is completely identical with that of the above first embodiment in FIG. 4, its description will be also omitted. It is assumed that the circuit structure of the single-lens reflex camera is identical with that shown in FIG. 1.

Parts different from the flowchart of the above-described first embodiment in FIG. 3 are steps #31 to #36 and therefore these steps will be described in detail.

In step #31, comparison is made whether the calculated result in the above step #17 exceeds the maximum value of the previous sampling or not, and if it exceeds the value, the maximum value is updated. Then, in succeeding step #32, it is judged whether the release switch SW2 has been turned on or not, and if the release switch SW2 is not on, processing is advanced to step #33, in which it is judged whether the maximum value is smaller than the predetermined value D1 or not. As a result, if the maximum value is smaller than a predetermined value D1, processing is advanced to step #35, and if the maximum value is larger than the predetermined value D1, processing is advanced to step #36.

If the release switch SW2 is on in the above step #32, processing is advanced to step #34, in which it is judged whether the maximum value is smaller than a predetermined value D2 or not. If the maximum value is smaller than a predetermined value D2, processing is advanced to step #35, and if the maximum value is larger than the predetermined value D2, processing is advanced to step #36. In this example, if the value of the predetermined value D2 is set to be larger than the amount of vibration occurring during a photographing operation of the camera, mis-detection of a tripod support detection which is caused by vibration occurring during the photographing operation can be prevented.

When processing is advanced to step #35, since the maximum value is smaller than the predetermined value D1 or D2, judgement is made that the camera is supported by a tripod (S_KYAKU=1). Also, when processing is advanced to step #36, since the maximum value is larger than the predetermined value D1 or D2, judgement is made that the camera is supported by hand (S_KYAKU=0). Thereafter, the operation of the above-described step #24 and the following steps is executed.

According to the above-described second embodiment, the operation of detecting the use of a tripod starts in response to turning-on of the switch SW1 in step #15, and the judgement level of detecting the use of a tripod is changed in accordance with the judged result of whether the release switch SW2 is on or not in step #32 (steps #33 and #34). Accordingly, mis-detection that the camera supported by a tripod is in the hand support state, which is caused by the fact that the mirror driving impact during a photographing operation and the shutter driving impact adversely affect the angular velocity sensor signal, can be reliably prevented without provision of any special means.

Also, an example in which detection of the use of a tripod is interrupted by turning on the release switch SW2 is described. Alternatively, if the judgement that the release switch SW2 is on in step #18 is changed to the judgement of whether a film is being fed or not, mis-detection that the camera supported by a tripod is in the hand support state, which is caused by the fact that a vibration caused by film feeding adversely affects the angular velocity sensor signal, can be reliably prevented.

Also, even judgement by the pop-up operation of a strobe built into the camera can obtain the same effect.

In this embodiment, the support state detecting means is the lens MPU 31, and its operation is represented by steps #16, 17 and steps #33 to #36 in FIG. 4.

Also, the support state detection control means is the lens MPU 31, and its operation is represented by steps #32 to #34 in FIG. 4.

(Third Embodiment)

A third embodiment of the present invention is also applied to an interchangeable lens for a single lens reflex camera as in the above-described first and second embodiments, in which the operation of detecting the use of a tripod starts upon turning on the switch SW1 of the camera, and the operation of detecting the use of a tripod is interrupted or continued as it is in accordance with the mounted camera upon turning on the release switch SW2.

Figure 6:
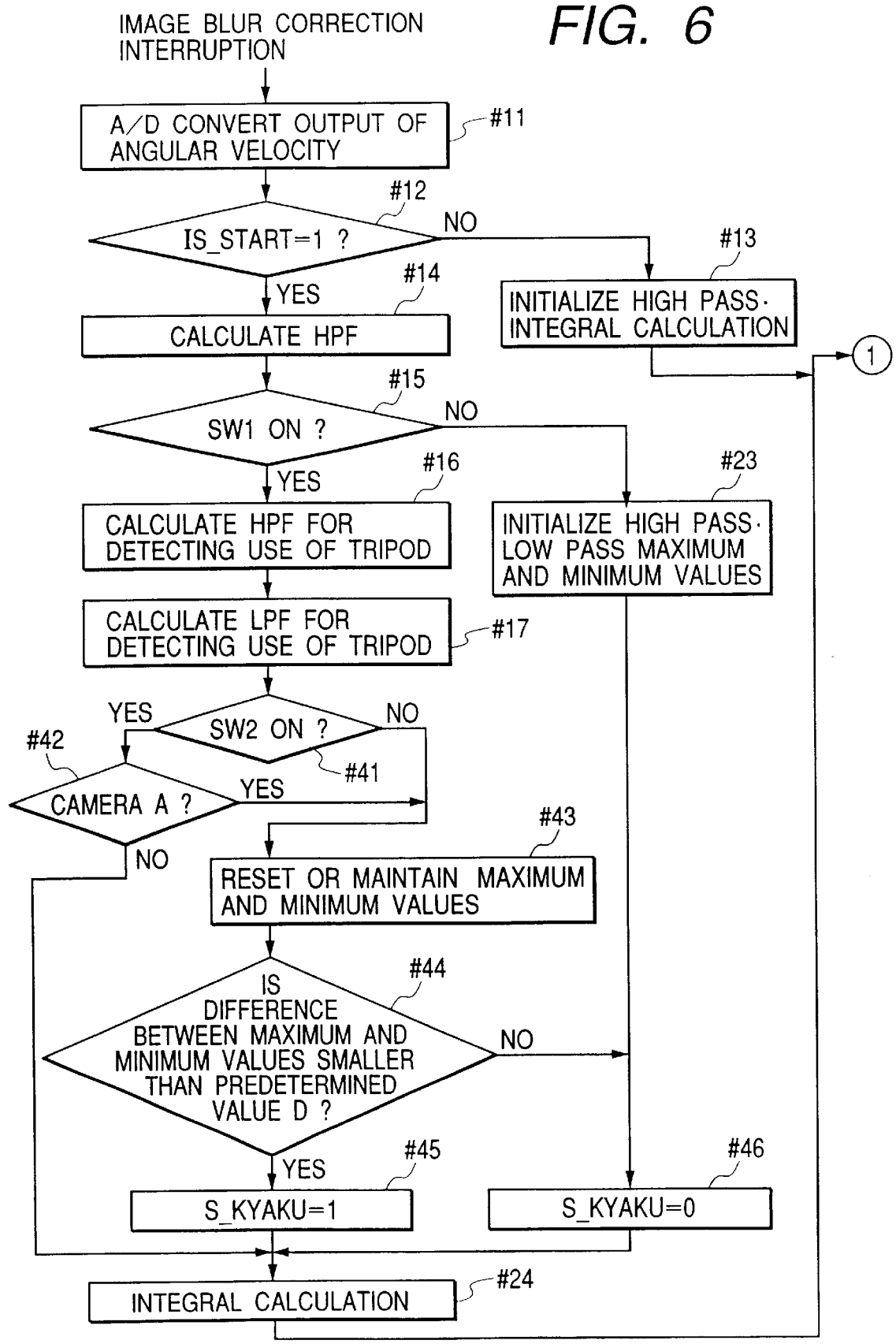
FIG. 6 is a flowchart showing a part of an image blur correction control operation in accordance with a third embodiment of the present invention.

FIG. 6 is a flowchart showing the operation of a main portion of the interchangeable lens side of the single-lens reflex camera in the third embodiment of the present invention, in which the same parts as those of the above first embodiment in FIG. 3 are designated by identical step numbers, and their description will be omitted. Also, since the operation shown in FIG. 6 and other figures is completely identical with that of the above first embodiment in FIG. 4, its description will be also omitted. It is assumed that the circuit structure of the single-lens reflex camera is identical with that shown in FIG. 1.

Parts different from the flowchart of the above-described second embodiment in FIG. 3 are steps #41 to #46, and therefore these steps will be described in detail.

In step #41, judgement is made whether the release switch SW2 has been turned on or not, and if the release switch SW2 is not on, processing is advanced to step #43. Comparison is made whether the calculated result in the above step #17 exceeds the maximum value or the minimum value of the previous sampling or not, and if the former exceeds the latter, the maximum value or the minimum value is updated. Then, in succeeding step #44, it is judged whether a difference between the maximum value and the minimum value is smaller than a predetermined value D or not. As a result, if the difference between the maximum value and the minimum value is smaller than the predetermined value D, processing is advanced to step #45, in which judgement is made that the camera is supported by a tripod (S_KYAKU= 1). Also, if the difference between the maximum value and the minimum value is larger than the predetermined value D, processing is advanced to step #46, in which judgement is made that the camera is supported by hand (S_KYAKU=0). Thereafter, the operation of step #24 and the following steps is executed.

Also, if the release switch SW2 is on in the above step #41, processing is advanced to step #42, in which judgement is made whether the type of the mounted camera is a camera A or not, and if it is a camera A, the operation of the above-described step #43 and the following steps is executed. If the type of the camera is not camera A, processing is advanced to step #24, in which the operation of detecting the use of a tripod is interrupted.

Specific examples of a camera A are a camera that does not drive a mirror, a camera that has little vibration during mirror driving or shutter driving, a digital camera, and so on, which are cameras that have little vibration during a photographing operation.

According to the above-described third embodiment, the operation of detecting the use of a tripod starts in response to turning-on of the switch SW1, and the operation of detecting the use of a tripod is interrupted or continued as it is in accordance with the judged result that the released switch SW2 is on or not in step #41 and the discriminated result of the type of the mounted camera in step #42. Accordingly, the optimum detection of the use of a tripod can be conducted in accordance with the type of the camera even during a photographing operation.

(Fourth Embodiment)

A fourth embodiment of the present invention is applied to an interchangeable lens for a single-lens reflex camera as in the above-described first to third embodiments, in which the operation of detecting the use of a tripod starts upon turning on the switch SW1 of the camera, and the judgement level for detecting the use of a tripod is changed in accordance with the type of the mounted camera upon turning on the release switch SW2.

Figure 7:
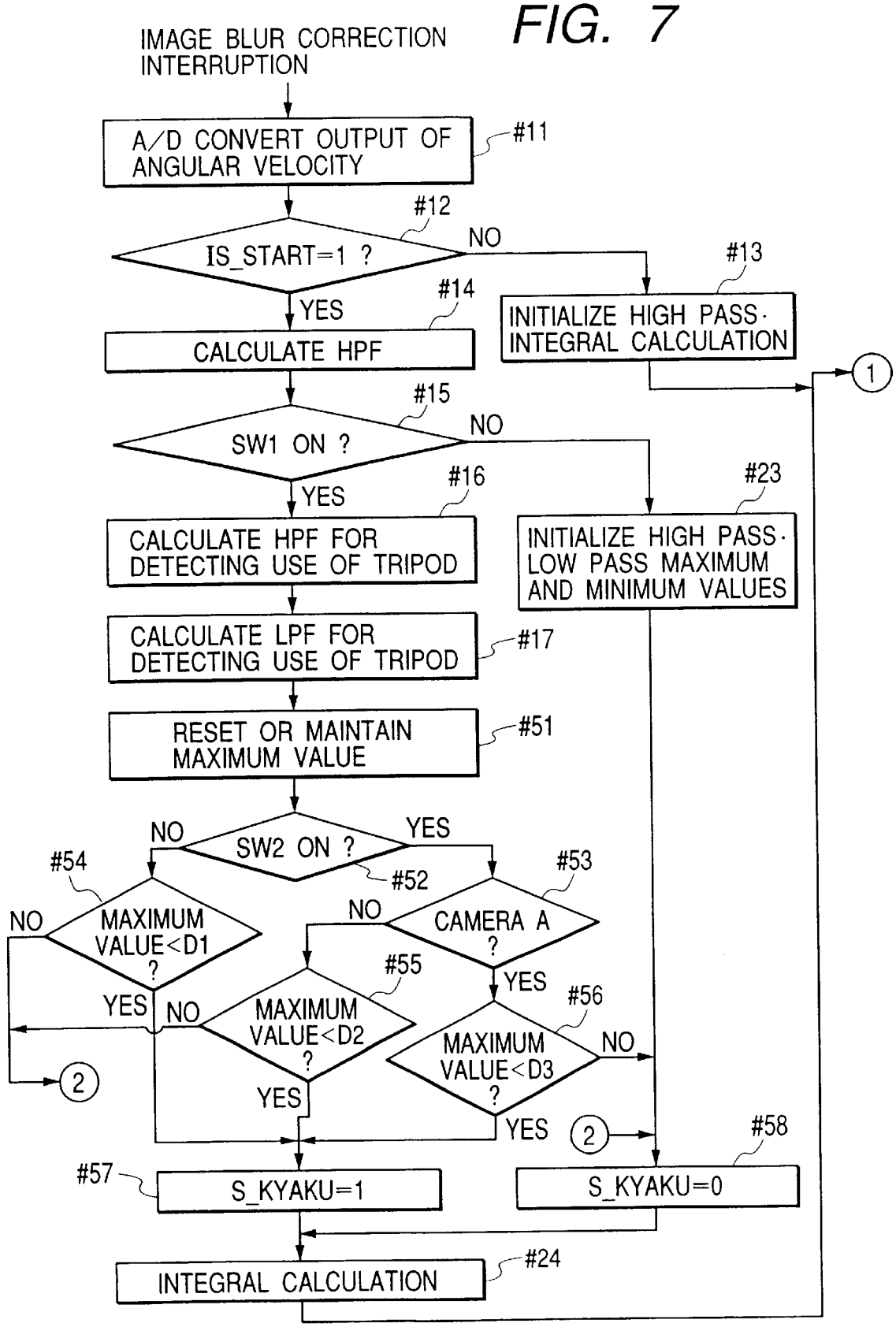
FIG. 7 is a flowchart showing a part of an image blur correction control operation in accordance with a fourth embodiment of the present invention.
Figure 8:
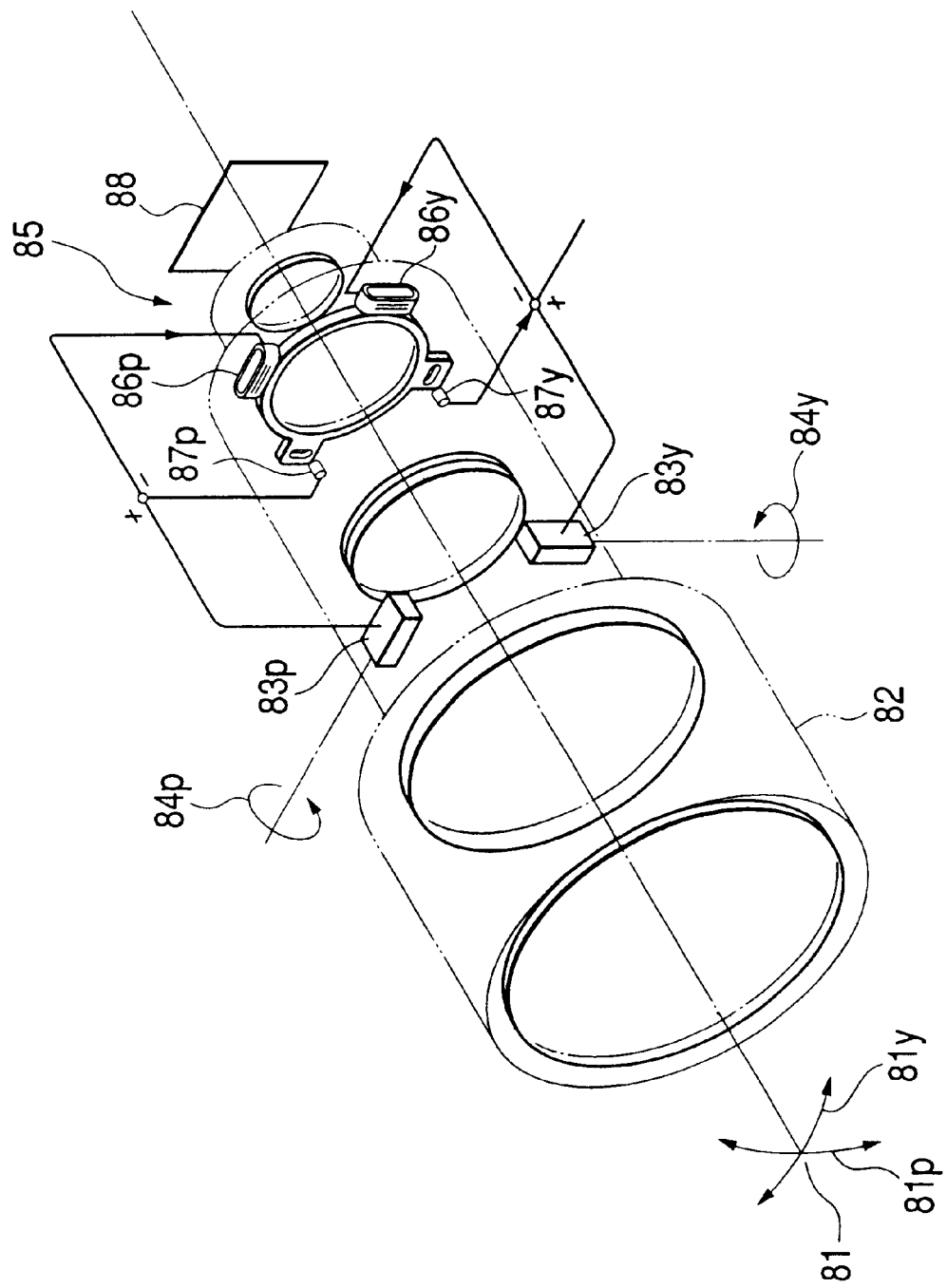
FIG. 8 is a perspective view for explanation of the structure of a conventional image blur correction device.
Figure 9:
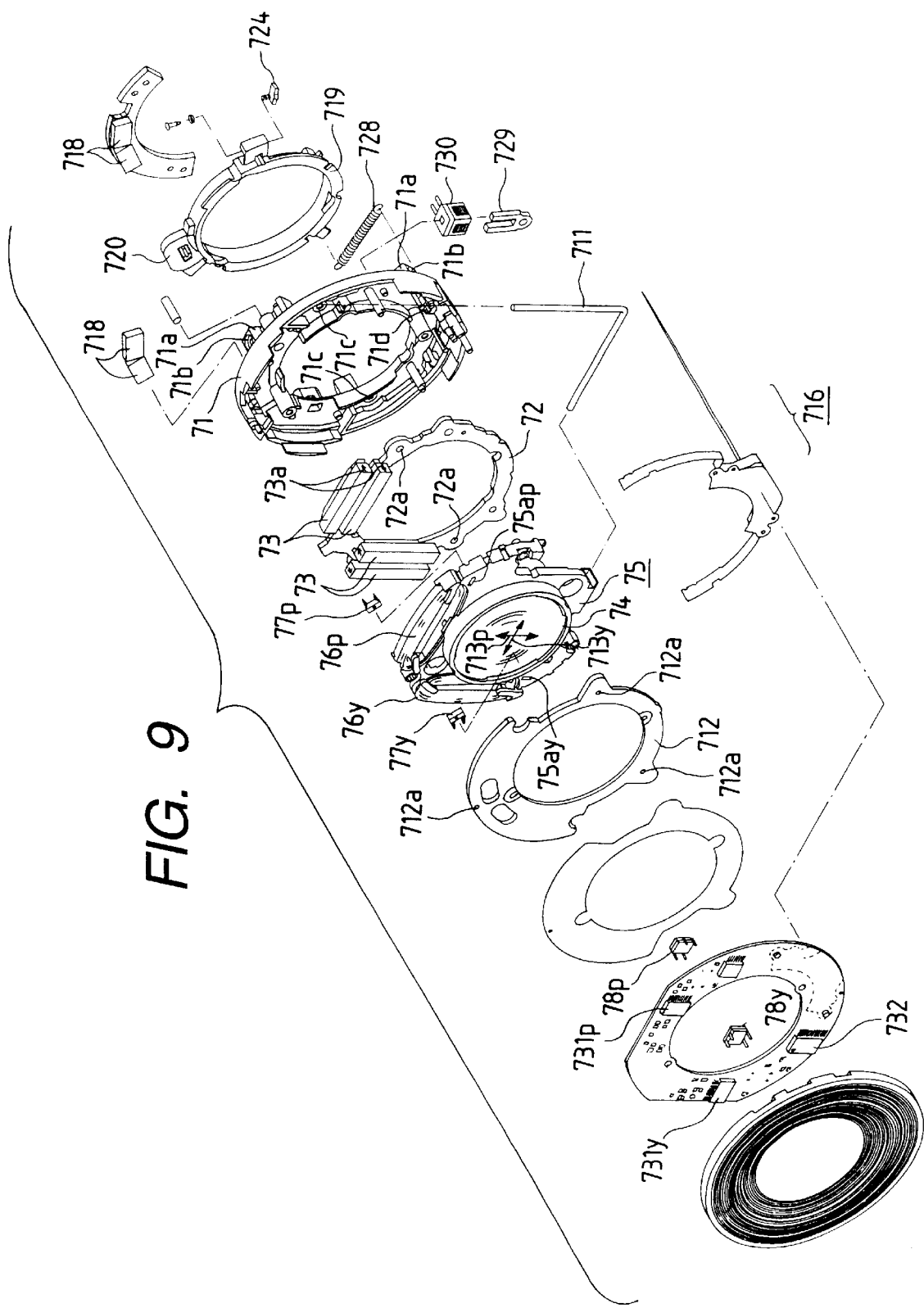
FIG. 9 is an exploded perspective view showing an example of the conventional image blue correction device.
Figure 10:
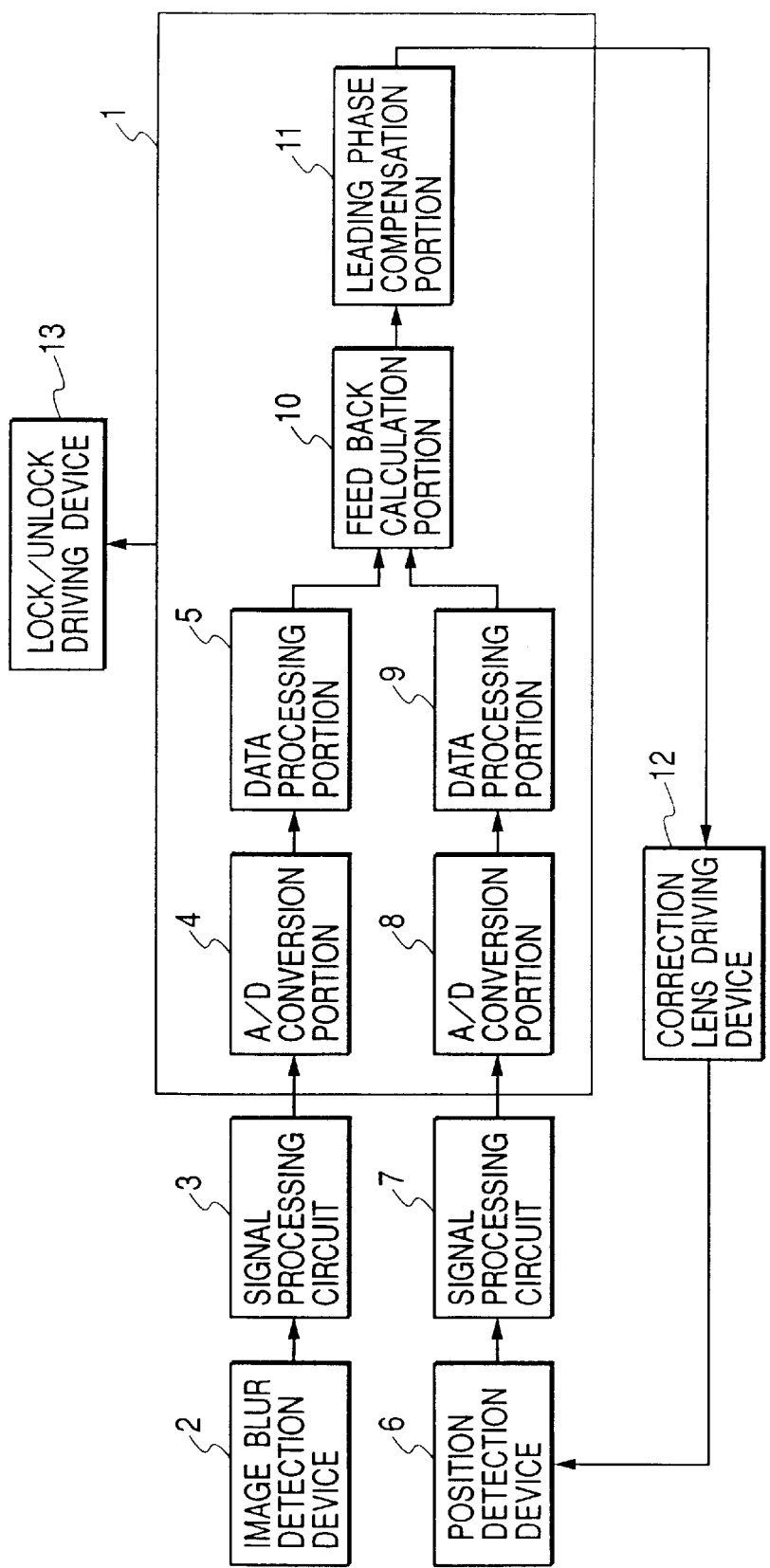
FIG. 10 is a block diagram showing an example of the electric structure of the conventional image blur correction device.

FIG. 7 is a flowchart showing the operation of a main portion of the interchangeable lens side of the single-lens reflex camera in the fourth embodiment of the present invention, in which the same parts as those of the above first embodiment in FIG. 3 are designated by identical step numbers, and their description will be omitted. Also, since the operation shown in FIG. 7 and other figures is completely identical with that of the above first embodiment in FIG. 4, its description will be also omitted. It is assumed that the circuit structure of the single-lens reflex camera is identical with that shown in FIG. 1.

Parts different from-the flowchart of the above-described first embodiment in FIG. 3 are steps #51 to #58, and therefore these steps will be described in detail.

In step #51, comparison is made whether the calculated result in the above step #17 exceeds the maximum value of the previous sampling or not, and if so, the maximum value is updated. In succeeding step #52, it is judged whether the release switch SW2 has been turned on or not, and if the release switch SW2 is not on, processing is advanced to step #54, in which it is judged whether the maximum value is smaller than a predetermined value D1 or not. If the maximum value is smaller than the predetermined value D1, processing is advanced to step #57, and if the maximum value is larger than the predetermined value D1, processing is advanced to step #58.

If the release switch SW2 is on in the above step #52, processing is advanced to step #53, in which judgement is made whether the type of the mounted camera is a camera A or not, and if it is a camera A, processing is advanced to step #56, whereas if it is not a camera A, processing is advanced to step #55, in which the operation of detecting the use of a tripod is conducted with the judgement level for detecting the use of a tripod in accordance with the type of the mounted camera.

Specific examples of a camera A are a camera that does not drive a mirror, a camera that has little vibration during mirror driving or shutter driving, a digital camera, and so on, which are cameras that have little vibration during a photographing operation.

In step #55, judgement is made whether the maximum value is smaller than a predetermined value D2 or not, and if the maximum value is smaller than the predetermined value D2, processing is advanced to step #57 which will be described later, whereas if the maximum value is larger than the predetermined value D2, processing is advanced to step #58. Also, in step #56, judgement is made whether the maximum value is smaller than a predetermined value D3 or not, and if the maximum value is smaller than the predetermined value D3, processing is advanced to step #57, which will be described later, whereas if the maximum value is larger than the predetermined value D3, processing is advanced to step #58.

In this example, if the values of the predetermined values D2 and D3 are set to be larger than the amount of vibration occurring during a photographing operation of the camera, mis-detection which is caused by vibration occurring during a photographing operation can be prevented.

In step #57, since the maximum value is smaller than the predetermined value D1, D2 or D3, judgement is made that the camera is supported by a tripod (S_KYAKU=1). Also, in step #58, since the maximum value is larger than the predetermined value D1, D2 or D3, judgement is made that the camera is supported by hand (S_KYAKU=0). Thereafter, the operation of the above-described step #24 and the following steps is executed.

According to the above-described fourth embodiment, the operation of detecting the use of a tripod starts in response to turning-on of the switch SW1 in step #15, and the judgement level for detecting the use of a tripod is changed in accordance with the judged result that the release switch SW2 is on in step #52 and the discriminated result of the type of the mounted camera in steps #55 and #56. Accordingly, the optimum detection of the use of a tripod can be conducted in accordance with the type of camera even during a photographing operation.

According to the above-described respective embodiments, the support state detection operation is interrupted or the detection judgement level is changed by turning on the release switch SW2. Accordingly, misdetection caused by vibrations such as mirror driving or shutter driving, except for hand vibration, can be prevented.

Also, in the case of a camera system of the interchangeable lens type, since the support state detection operation during a photographing operation is interrupted by the mounted camera, or the detection level is changed, the optimum support state detection can be conducted in accordance with the type of camera even during a photographing operation.

(Modified Example)

The above-described respective embodiments show examples in which the control device for image blur correction conducts digital control, but analog control may be conducted instead.

The above-described respective embodiments show examples in which the control device for image blur correction is equipped within an interchangeable lens together with a vibration detection sensor and a correction lens. As another example, the present invention may be applied to a type in which a vibration detection sensor is equipped within the camera, a correction lens is equipped within the interchangeable lens, and the output of the vibration detection sensor is transmitted from the camera side to the interchangeable lens side, and control shown in FIG. 3 and so on is conducted by a microcomputer within the camera.

Also, the above-described respective embodiments show examples in which the image blur correction device is built into the interchangeable lens. Alternatively, the image blur correction device may not be equipped within the interchangeable lens, but may be provided as an accessary which is inserted into a conversion lens attached to the front portion of the interchangeable lens.

Also, the present invention may be applied to a camera such as a lens shutter camera or a video camera, and further can be applied as another optical equipment, another device or a structural unit.

Also, in the above-described respective embodiments, an angular velocity sensor is employed as an example of the vibration sensor. However, any kind of vibration sensor can be applied if vibration can be detected, for example, an angular acceleration sensor, an acceleration sensor, a velocity sensor, an angular displacement sensor, and a displacement sensor, as well as a method of detecting image blur, per se.

Also, in the above-described respective embodiments, as the support state detecting method, there is shown a method of obtaining the difference between the maximum value and the minimum value of the vibration angular velocity. Alternatively, the vibration acceleration/displacement may be applied and not the difference of the maximum value and the minimum value but only the magnitude of the maximum value may be applied. Thus, any methods may be applied if the support state can be detected.

As described above, according to the above respective embodiments of the present invention, there can be provided a support state detection device or a camera with an image blur correction function, which can prevent the detection of the support state from being mistaken by using the output of the vibration detection means during given operation and can always detect the support state with accuracy.

Also, according to the above-described respective embodiments, there can be provided an interchangeable lens with an image blur correction function which is capable of always detecting the support state with accuracy even if a camera of a different type is mounted thereon.

Further, according to the above-described respective embodiments, there can be provided a camera with an image blur correction function or a device for image blur correction which can prevent improper image blur correction from being conducted even if detection of the support state is mistaken by using the output of vibration detection means during a given operation.

What is claimed is:

1. A control device for an image blur correction device that conducts an image blur correcting operation for a camera in response to a vibration signal corresponding to an output of a vibration detection sensor, said control device comprising:

support state determination means for determining whether the image blur correction device is in a predetermined support state or not, in accordance with the vibration signal corresponding to the output of the vibration detection sensor;

operation state control means for controlling an operating state of said image blur correction device in response to a determination by said support state determination means so as to set the operating state in a first state, in which said image blur correction device does not conduct a predetermined image blur correcting operation when said support state determination means determines that the image blur correction device is in the predetermined support state, and to shift the operating state to a second state, in which said image blur correction device conducts the predetermined image blur correcting operation in response to a determination by said support state determination means that the image blur correction device is released from the predetermined support state; and regulating means for regulating a shift of the operation state from the first state to the second state, when a predetermined operation of the camera starts, in response to a determination by said support state determination means, which is responsive to the determination by said support state determination means that the image blur correction device is released from the predetermined support state.

2. The control device according to claim 1, wherein said regulating means inhibits a shift of the operating state from the first state to the second state in accordance with a determination that the image blur correction device is released from the predetermined support state by said support state determination means when the predetermined operation of the camera starts.

3. The control device according to claim 2, wherein said regulating means interrupts a determination by said support state determination means when the predetermined operation of the camera starts.

4. The control device according to claim 1, wherein said regulating means changes a determination reference for a determination that the image blur correction device is released from the predetermined support state by said support state determination means when the predetermined operation of the camera starts.

5. The control device according to claim 4, wherein said support state determination means determines that the image blur correction device is not in the predetermined support state in accordance with a fact that an amplitude of the vibration signal corresponding to the output of the vibration detection sensor becomes larger than a predetermined amplitude, and said regulating means sets the predetermined amplitude used for the determination by said support state determination means to a larger value when the predetermined operation of the camera starts.

6. The control device according to claim 1, wherein said regulating means performs a regulating operation when a photographing operation of the camera is conducted.

7. The control device according to claim 6, wherein said regulating means performs a regulating operation in accordance with a fact that an operation of subjecting the camera to a photographing operation is made.

8. The control device according to claim 1, wherein said regulating means performs a regulating operation when a shutter of the camera is driven.

9. The control device according to claim 1, wherein said regulating means performs a regulating operation when a film of the camera is fed.

10. The control device according to claim 1, wherein said operation state control means controls the operation state of said image blur correction device so as to conduct the image blur correcting operation at a predetermined frequency characteristic in the second state when said support state determination means determines that the image blur correction device is not in the predetermined support state.

11. The control device according to claim 10, wherein said operation state control means controls the operation state of said image blur correction device so as to conduct the image blur correcting operation at a frequency characteristic different from the predetermined frequency characteristic in the first state when said support state determination means determines that the image blur correction device is in the predetermined support state.

12. The control device according to claim 11, wherein said operation state control means controls the operation state of said image blur correction device so as to conduct the image blur correcting operation on a vibration having a frequency component lower than the predetermined frequency in the second state when said support state determination means determines that the image blur correction device is not in the predetermined support state, and which controls the operation state of said image blur correction device so as not to conduct the image blur correcting operation on a vibration having a frequency component lower than the predetermined frequency in the first state when said support state determination means determines that the image blur correction device is in the predetermined support state.

13. The control device according to claim 11, wherein said image blur correction device operates in accordance with an output of a processing circuit that cuts off the vibration signal at a frequency side lower than a predetermined cut-off frequency, and said operation state control means controls the operation state so as to allow said cut-off frequency to change in accordance with the determination of said support state determination means.

14. The control device according to claim 11, wherein said image blur correction device operates in accordance with an output of an integral circuit that integrates the vibration signal, and said operation state control means controls the operation state so as to change the integral frequency characteristic of the integral circuit in accordance with the determination of said support state determination means.

15. A camera system to which an image blur correction device for conducting an image blur correcting operation in response to a vibration signal corresponding to an output of a vibration detection sensor is applied, said camera system comprising:

support state determination means for determining whether the image blur correction device is in a predetermined support state or not, in accordance with the vibration signal corresponding to the output of the vibration detection sensor;

operation state control means for controlling an operating state of the image blur correction device in response to the determination by said support state determination means so as to set the operating state in a first state, in which the image blur correction device does not conduct a predetermined image blur correcting operation when said support state determination means determines that the image blur correction device is in the predetermined support state, and to shift the operating state to a second state, in which the image blur correction device conducts the predetermined image blur correcting operation in response to a determination by said support state determination means that the image blur correction device is released from the predetermined support state; and regulating means for regulating a shift of the operation state from the first state to the second state, when a predetermined operation of the camera system starts, in response to a determination by said support state determination means, which is responsive to the determination by said support state determination means that the image blur correction device is released from the predetermined support state.

16. An image blur correction apparatus for use with a camera, comprising:

an image blur correction device which conducts an image blur correcting operation in response to a vibration signal corresponding to an output of a vibration detection sensor;

support state determination means for determining whether said image blur correction device is in a predetermined support state, or not, in accordance with the vibration signal corresponding to the output of the vibration detection sensor;

operation state control means for controlling an operating state of said image blur correction device in response to the determination by said support state determination means so as to set the operating state in a first state, in which said image blur correction device does not conduct a predetermined image blur correcting operation when said support state determination means determines that said image blur correction device is in the predetermined support state, and to shift the operating state to a second state, in which said image blur correction device conducts the predetermined image blur correcting operation in response to a determination by said support state determination means that said image blur correction device is released from the predetermined support state; and regulating means for regulating a shift of the operating state from the first state to the second state, when a predetermined operation of the camera starts, in response to a determination by said support state determination means, which is responsive to the determination by said support state determination means that said image blur correction device is released from the predetermined support state.

17. An optical apparatus comprising:

an optical system; and an image blur correction device for correcting image blur of said optical system, said image blur correction device comprising:

support state determination means for determining whether said optical apparatus is in a predetermined support state or not, based on a vibration signal output from vibration detection means;

operation state control means for controlling an operating state of said image blur correction device, so as to set said image blur correction device in a first state, in which said image blur correction device does not conduct a predetermined image blur correcting operation, based on a determination of said support state determination means that said optical apparatus is in the predetermined support state, said operation state control means controlling the operating state of said image blur correction device so as to shift to a second state, in which said image blur correction device conducts the predetermined image blur correcting operation, based on a determination of said support state determination means that said optical apparatus is not in the predetermined support state; and regulating means for regulating a shift of the operating state of said image blur correction device from the first state to the second state when said optical apparatus is performing a predetermined imaging operation.

18. The optical apparatus according to claim 17, wherein said regulating means inhibits a shift from the first state to the second state when said optical apparatus is performing the predetermined imaging operation.

19. The optical apparatus according to claim 18, wherein said regulating means interrupts a determination by said support state determination means when said optical apparatus is performing the predetermined imaging operation.

20. The optical apparatus according to claim 17, wherein said regulating means changes a determination reference for a determination by said support state determination means when said optical apparatus is performing the predetermined imaging operation.

21. The optical apparatus according to claim 20, wherein said support state determination means determines, in accordance with a fact that an amplitude of the vibration signal corresponding to the output of the vibration detection means becomes larger than a predetermined amplitude, that the optical apparatus is not in the predetermined support state, and said regulating means sets the predetermined amplitude used for the determination by said support state determination means to a larger value when said optical apparatus is performing the predetermined imaging operation.

22. The optical apparatus according to claim 17, wherein said operation state control means controls the operating state so as to allow the image blur correction device to conduct the predetermined image blur correcting operation at a predetermined frequency characteristic in the second state when said support state determination means determines that the optical apparatus is not in the predetermined support state.

23. The optical apparatus according to claim 22, wherein said operation state control means controls the operating state so as to allow the image blur correction device to conduct the predetermined image blur correcting operation at another predetermined frequency characteristic, in the first state, different from the predetermined frequency characteristic, when said support state determination means determines that the optical apparatus is in the predetermined support state.

24. The optical apparatus according to claim 23, wherein said operation state control means controls the operating state so as to allow said image blur correction device, in the second state, to conduct an image blur correcting operation based on a vibration of a frequency component lower than the predetermined frequency, when said support state determination means determines that the optical apparatus is not in the predetermined support state, and said operation state control means controls the operating state so as not to allow said image blur correction device, in the first state, to conduct an image blur correcting operation based on a vibration having a frequency component lower than the predetermined frequency, when said support state determination means determines that the optical apparatus is in the predetermined support state.

25. The optical apparatus according to claim 23, wherein said image blur correction device operates in accordance with an output of an integral circuit that integrates the vibration signal, and said operation state control means changes an integral frequency characteristic of said integral circuit in accordance with the determination of said support state determination means.

26. An interchangeable lens for use with a camera, comprising:

a lens optical system; and an image blur correction device that corrects image blur of said lens optical image blur correction device comprising:

support state determination means for determining whether the camera is in a predetermined support state or not, based on a vibration signal output from vibration detection means;

operation state control means for controlling an operating state of said image blur correction device, so as to set the operating state in a first state, in which said image blur correction device does not conduct a predetermined image blur correcting operation based on a determination by said support state determination means that said camera is in the predetermined support state, said operation state control means controlling the operating state of said image blur correction device so as to shift the operating state to a second state, in which said image blur correction device conducts the predetermined image blur correcting operation, based on a determination by said support state determination means that said camera is not in the predetermined support state; and regulating means for regulating a shift of the operating state of said image blur correction device from the first state to the second state when the camera is performing a predetermined imaging operation.

27. A camera comprising:

an optical system; and an image blur correction device that corrects image blur of said optical system, said image blur correction device comprising:

support state determination means for determining whether the camera is in a predetermined support state or not, based on a vibration signal output from vibration detection means;

operation state control means for controlling an operating state of said image blur correction device so as to set the operating state in a first state, in which said image blur correction device does not conduct a predetermined image blur correction operation, based on a determination by said support state determination means that the camera is in the predetermined support state, said operation state control means controlling the operating state of said image blur correction device so as to shift to a second state, in which said image blur correction device conducts the predetermined image blur correcting operation, based on a determination by said support state determination means that the camera is not in the predetermined support state; and regulating means for regulating a shift of the operating state of said image blur correction device from the first state to the second state when the camera is performing a predetermined imaging operation.

28. An optical apparatus comprising:

an optical system; and an image blur correction device that corrects image blur of the optical system, said image blur correction device comprising:

support state determination means for determining whether the optical apparatus is in a predetermined support state or not, based on a vibration signal output from vibration detection means;

operation state control means for controlling an operating state of said image blur correction device between a first state and a second state, based on a determination by said support state determination means; and regulating means for inhibiting the support state determination means from determining whether the optical apparatus is in the predetermined support state or not when the optical apparatus is performing a predetermined imaging operation.

29. An interchangeable lens for use with a camera comprising:

an optical system; and an image blur correction device that corrects image blur of said optical system, said image blur correction device comprising:

support state determination means for determining whether the camera is in a predetermined support state or not, based on a vibration signal output from vibration detection means;

operation state control means for controlling a changeover of an operating state of said image blur correction device between a first state and a second state, based on a determination by said support state determination means; and regulating means for inhibiting the support state determination means from determining whether the camera is in the predetermined support state or not when the camera is performing a predetermined imaging operation.

30. A camera comprising:

an optical system; and an image blur correction device that corrects image blur in said optical system, said image blur correction device comprising:

support state determination means for determining whether the camera is in a predetermined support state or not, based on a vibration signal output from vibration detection means;

operation state control means for controlling a changeover of the operating state of said image blur correction device between a first state and a second state, based on a determination by said support state determination means; and regulating means for inhibiting said support state determination means from determining whether the camera is in the predetermined support state or not when the camera is performing a predetermined imaging operation.

31. An interchangeable lens, attachable to different types of cameras, comprising:

an optical system; and an image blur correction device that corrects image blur of the optical system, said image blur correction device comprising:

camera type determination means for determining a type of camera attached to the interchangeable lens;

support state determination means for determining whether the camera is in a predetermined support state or not, based on a vibration signal output from vibration detection means;

operation state control means for controlling a changeover of the operating state of said image blur correction device between a first state and a second state, based on a determination by said support state determination means; and regulating means for regulating a shift of the operating state of said image blur correction device from the first state to the second state based on a determination by the camera type determination means and a determination by said support state determination means when the camera is performing a predetermined imaging operation.

32. An interchangeable lens, attachable to different types of cameras, comprising:

an optical system; and an image blur correction device that corrects image blur in said optical system, said image blur correction device comprising:

camera type determination means for determining a type of camera attached to the interchangeable lens;

support state determination means for determining whether the camera is in a predetermined support state or not, based on a vibration signal output from vibration detection means;

operation state control means for controlling a changeover of the operating state of said image blur correction device between a first state and a second state, based on a determination by said support state determination means; and regulating means for inhibiting said support state determination means from determining whether the camera is in the predetermined support state or not, based on a determination by said camera type determination means when the camera is performing a predetermined imaging operation.

* * * * *

UNITED STATES PATENT AND TRADEMARK OFFICE
CERTIFICATE OF CORRECTION

PATENT NO.     : 6,408,135 B1
DATED          : June 18, 2002
INVENTOR(S)    : Shinji Imada It is certified that error appears in the above-identified patent and that said Letters Patent is hereby corrected as shown below:

Column 2,
Line 41, "the-drive" should read -- the drive --.

Column 6,
Line 47, "instep" should read -- in step --.

Column 8,
Line 46, "even:" should read -- even --.

Column 12,
Line 10, "from-the" should read -- from the --.

Column 18,
Line 27, "lens optical image blur correction device" should read -- lens optical system, said image blur correction device --.

Signed and Sealed this

Third Day of December, 2002

JAMES E. ROGAN
*Director of the United States Patent and Trademark Office*